United States Patent [19]

Setiabudi

[11] Patent Number: 5,922,802
[45] Date of Patent: Jul. 13, 1999

[54] THIXOTROPIC AGENT FOR FILLED CYCLOOLEFINS

[75] Inventor: Frans Setiabudi, Eschbach, Germany

[73] Assignee: Ciba Specialty Chemicals Corporation, Tarrytown, N.Y.

[21] Appl. No.: 08/988,096

[22] Filed: Dec. 10, 1997

[30] Foreign Application Priority Data

Dec. 10, 1996 [CH] Switzerland .............................. 3025/96

[51] Int. Cl.⁶ ..................................................... C08K 3/00
[52] U.S. Cl. ........................... 524/482; 524/425; 524/445; 524/447; 524/483
[58] Field of Search .................................... 524/482, 483, 524/425, 445, 447

[56] References Cited

U.S. PATENT DOCUMENTS 4,703,082 10/1987 Godlewski .............................. 524/731
5,480,940 1/1996 Khasat et al. ........................... 525/290

*Primary Examiner*—Edward J. Cain
*Attorney, Agent, or Firm*—David R. Crichton; Michele A. Kovaleski

[57] ABSTRACT

A composition, comprising
(a) a strained cycloolefin,
(b) a filler, and
(c) 0.01–10.0% by weight, based on the sum of components (a)+(b), of a copolymer selected from the group consisting of core/shell polymers and microgels, is distinguished by having high storage stability and gives polymers having high heat stability, toughness and mechanical strength, which polymers are suitable as encapsulating material for electrical and electronic components.

13 Claims, No Drawings

THIXOTROPIC AGENT FOR FILLED CYCLOOLEFINS

The present invention relates to a composition comprising a strained cycloolefin, a filler and a core/shell polymer or a microgel, to a process for the preparation of a metathesis polymer from this composition as well as to the use of this composition as encapsulating material for electrical or electronic components.

Owing to their good mechanical and electrical properties, cycloolefins which can be polymerised by ring-opening metathesis polymerisation (ROMP) should in principle be suited for electrical applications. Such systems are described, inter alia, in WO 96/16100, WO 96/20235 or in EP-A-348 852.

The low viscosity of cycloolefins, such as dicyclopentadiene, allows a very high filler content; i.e. it is possible to prepare mixtures having a filler content of up to 75% using conventional fillers, such a quartz powder or wollastonite. However, in such mixtures the fillers tend to sediment, i.e. fairly large agglomerates may form during storage which substantially impairs the processability.

This problem could not be solved so far by adding conventional thixotropic agents, for example Aerosil®. When using heat-sensitive cycloolefins, such as dicyclopentadiene, the dissolution of thermoplastic thickeners at elevated temperature is not suitable either.

It has now been found that it is possible to prevent the filler from sedimenting by adding small amounts of core/shell polymers or microgels. Such mixtures remain homogeneous even when stored over a prolonged period of time and can easily be stirred because even slight stirring results in a drop in viscosity (thixotropic effect).

This invention relates to a composition, comprising
(a) a strained cycloolefin,
(b) a filler, and
(c) 0.01–10.0% by weight, based on the sum of components (a)+(b), of a copolymer selected from the group consisting of core/shell polymers and microgels.

Within the scope of this invention, strained cycloolefins will be understood as meaning all cycloolefins with the exception of cyclohexene and its derivatives which cannot be polymerised by ring-opening metathesis.

The strained cycloolefins may be monocyclic or polycyclic condensed or bridged ring systems, for example having two or four rings. These ring systems can be unsubstituted or substituted and can contain one or several hetero atoms, such as O, S, N or Si, and/or condensed aromatic or heteroaromatic rings, for example o-phenylene, o-naphthylene, o-pyridinylene or o-pyrimidinylene. The individual cyclic rings can contain 3 to 16, preferably 3 to 12 and, particularly preferably, 3 to 8, ring members. The strained cycloolefins may contain further alicyclic double bonds, preferably 2 to 4 such additional double bonds, depending on the ring size. The ring substituents are inert, i.e. these substituents do not impair the chemical stability and the thermostability of the ROMP catalysts.

If the strained cycloolefins contain more than one double bond, for example 2 to 4 double bonds, crosslinked polymers may also form, depending on the reaction conditions, the selected monomer and the amount of catalyst.

Preferred components (a) are Diels-Alder adducts of cyclopentadiene.

Suitable Diels-Alder adducts of cyclopentadiene are, for example, the following compounds:

 (1)

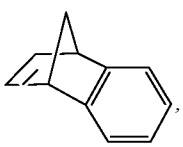 (2)

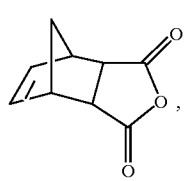 (3)

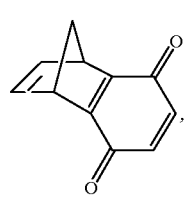 (4)

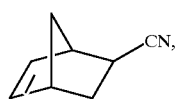 (5)

 (6)

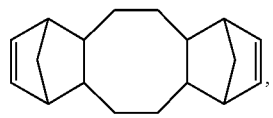 (7)

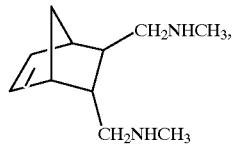 (8)

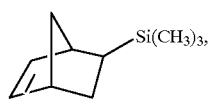 (9)

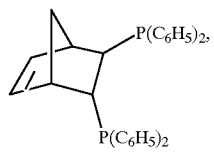 (10)

-continued

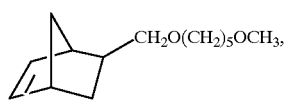 (11)

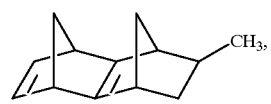 (12)

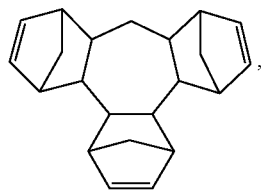 (13)

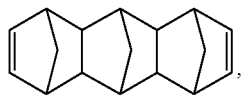 (14)

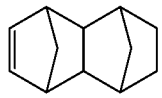 (15)

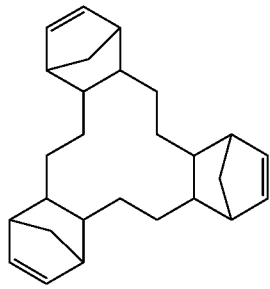 (16)

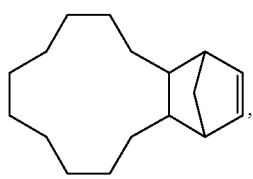 (17)

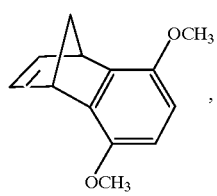 (18)

-continued

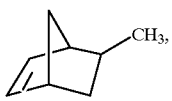 (19)

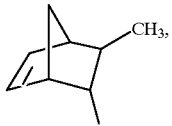 (20)

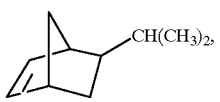 (21)

 (22)

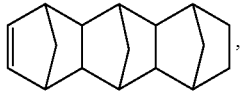 (23)

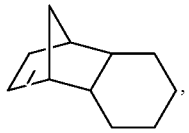 (24)

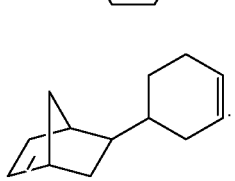 (25)

Preferred Diels-Alder adducts are norbornene (1), norbornadiene (6), cyclohexenylnorbornene (25), tetracyclododecene (14), methyltetracyclododecene (11) and, in particular, dicyclopentadiene (18).

Suitable fillers which can be used as component (b) in the novel compositions are, for example, metal powder, wood flour, powdered glass, glass beads, semimetal oxides and metal oxides, typically $SiO_2$ (aerosils, quartz, quartz powder, fused silica), aluminium oxide, aluminium oxide trihydrate and titanium oxide, semimetal nitrides and metal nitrides, typically silicium nitride, boron nitride and aluminium nitride, semimetal carbides and metal carbides (SiC), metal carbonates (dolomite, chalk, $CaCO_3$), metal sulfates (baryte, gypsum), mineral powders, natural or synthetic minerals, for example metal silicates, such a talcum, mica, kaolin, wollastonite and bentonite, or also plastic powders, e.g. from polyethylene, polypropylene or polybutylene terephthalate.

Component (b) is preferably a metal oxide, metal carbonate, metal sulfate or metal silicate, or $SiO_2$.

Component (b) is particularly preferably $CaCO_3$, $Al_2O_3$, $Al(OH)_3$, wollastonite and, especially, $SiO_2$.

Of the different $SiO_2$ modifications, quartz powder and synthetic silica flour are particularly preferred.

Component (c) in the novel compositions can be core/shell polymers and also microgels as well as mixtures of microgels and core/shell polymers.

Core/shell polymers are graft copolymers which consist of an elastomeric partially cross-linked core ($T_g<0°$ C.) and a grafted hard shell ($T_g$>room temperature). Particle size and grafting degree of these core/shell polymers can be adjusted via the preparation processes. The particle sizes are usually in the range from 50 to 800 nm. Preferred systems are those having particles sizes of 100 to 500 nm, preferably of 100 to 300 nm.

Core/shell polymers are usually prepared by an emulsion polymerisation process and are described, inter alia, in U.S. Pat. No. 4,419,496 or in EP-A-45357, and some are commercially available, for example Acryloid® or Paraloid® (Rohm & Haas, USA).

Suitable rubber-like grafting cores are, for example, polybutadiene, poly-n-butylacrylate, polysiloxane, polysulfides, polyacrylate rubber, butyl rubber, isoprene elastomers, ethylene/propylene/diene copolymers and styrene/butadiene copolymers.

The core material preferably contains polybutadiene or styrene/butadiene copolymers.

The grafting shell may consist, for example, of polystyrene, polyacrylonitrile, methylacrylate/acrylic acid copolymers, polymethyl methacrylate, α-methylstyrene/acrylonitrile/methyl methacrylate copolymers, styrene/acrylonitrile copolymers or styrene/acrylonitrile/glycidyl methacrylate copolymers or of mixtures of these polymers.

The shell material is preferably polymethyl methacrylate.

It is preferred to use core/shell polymers containing a core selected from the group consisting of polybutadiene, polybutadiene/polystyrene and polybutadiene/acrylonitrile, and a shell selected from the group consisting of polymers based on methyl methacrylate, cyclohexyl methacrylate, butyl acrylate, styrene, methacrylonitrile, vinyl acetate and vinyl alcohol.

In another embodiment of this invention, component (c) in the novel compositions is a microgel.

Microgels are usually understood as being macromolecules, the chain segments of which are crosslinked in the region of the individual coils via covalents bridges. Microgels can be prepared by different known polymerisation methods. An advantageous method is the emulsion polymerisation of compounds with polymerisable C—C double bonds in the presence of so-called multifunctional crosslinkers, for example according to the seeding technique. In this case, the microgel particles obtained after polymerisation are in the form of an aqueous emulsion or suspension.

Compounds which may, in principle, be used as multifunctional crosslinkers are all those containing at least two polymerisable C—C double bonds.

Intramolecularly crosslinked copolymers are then obtained which usually have particle sizes in the nanometer range (about 5–1000 nm).

A preferred microgel is a copolymer consisting of at least one unsaturated carboxylic acid and at least one multifunctional crosslinker.

A particularly preferred microgel is a copolymer consisting of at least one unsaturated carboxylic acid, at least one vinyl monomer which is free of carboxylic acid groups and at least one multifunctional crosslinker.

Suitable carboxylic acids for the preparation of the microgels containing carboxylic acid groups are, in principle, all those containing a polymerisable C—C double bond.

Preferred unsaturated carboxylic acids are acrylic acid, methacrylic acid, 2-carboxyethyl acrylate, 2-carboxyethyl methacrylate, mono(2-acryloylethyl) phthalate, mono(2-methacryloylethyl) phthalate, maleic acid, monomethyl maleate, monoethyl maleate, fumaric acid, monomethyl fumarate, monoethyl fumarate, itaconic acid, cinnamic acid, crotonic acid, 4-vinylcyclohexane carboxylic acid, 4-vinylphenyl acetic acid and p-vinylbenzoic acid.

Acrylic acid and methacrylic acid are particularly preferred.

Suitable multifunctional crosslinkers are, in principle, all compounds containing at least two polymerisable C—C double bonds. Other suitable multifunctional crosslinkers are mixtures of at least two vinyl monomers, such as methacrylic acid and glycidyl methacrylate, which can react with each other via additional functional groups during or after the polymerisation reaction.

It is preferred to use a polyfunctional acrylic ester or methacrylic ester of an aliphatic, cycloaliphatic or aromatic polyol, an addition product of acrylic acid or methacrylic acid and a polyglycidyl compound, an addition product of acrylic acid or methacrylic acid and glycidyl acrylate or glycidyl methacrylate, alkenyl acrylate or alkenyl methacrylate, dialkenylcyclohexane or dialkenylbenzene, as multifunctional crosslinker.

Particularly preferred multifunctional crosslinkers are ethylene glycol diacrylate, ethylene glycol dimethacrylate, propylene glycol diacrylate, propylene glycol dimethacrylate, 1,4-butanediol diacrylate, 1,4-butanediol dimethacrylate, polyethylene glycol diacrylate, polyethylene glycol dimethacrylate, polypropylene glycol diacrylate, polypropylene glycol dimethacrylate, 1,1,1-trimethylolpropane triacrylate, 1,1,1-trimethylolpropane trimethacrylate, diglycidyl ether diacrylate of bisphenol A, diglycidyl ether dimethacrylate of bisphenol A, allyl acrylate, allyl methacrylate, divinylcyclohexane and divinylbenzene.

The monomer mixture used for the preparation of the microgels may contain one or several vinyl monomers which are free of carboxylic acid groups, for example butadiene and butadiene derivatives, acrylonitrile, methacrylonitrile, acrylic esters and acrylamides, methacrylates and methacrylamides, vinyl ethers and vinyl esters, allyl ethers and allyl esters, styrene and styrene derivatives.

Preferred vinyl monomers which are free of carboxylic acid groups are alkyl esters, hydroxyalkyl esters and glycidyl esters of unsaturated carboxylic acids and styrene derivatives.

Particularly preferred vinyl monomers which are free of carboxylic acid groups are methyl acrylate, methyl methacrylate, ethyl acrylate, ethyl methacrylate, 2-hydroxyethyl acrylate, 2-hydroxyethyl methacrylate, butyl acrylate, butyl methacrylate, 2-ethylhexyl acrylate, 2-ethylhexyl methacrylate and styrene.

The amounts of components (a) and (b) in the novel compositions can vary within a wide range.

The weight ratio of components (a):(b) is preferably from 5:1 to 1:5, particularly preferably from 3:1 to 1:3 and, most preferably, from 2:1 to 1:2.

Component (c) is already effective in very small amounts. The compositions of this invention preferably contain 0.02–2.0% by weight, in particular 0.04–1.0% by weight, of component (c), based on the sum of components (a)+(b).

The novel compositions may be polymerised in the presence of a suitable catalyst without any problems to products having good mechanical and electrical properties.

Accordingly, this invention also relates to a composition comprising the above-defined components (a) to (c) and, additionally, (d) a catalyst for the ring-opening metathesis polymerisation.

As catalysts for the ring-opening metathesis polymerisation (ROMP catalysts), many compounds of the transition metals titanium, vanadium, molybdenum, tungsten, rhenium, iridium, ruthenium and osmium are known to the person skilled in the art. These are, for example, complex metal halides, metal carbenes or coordination catalysts of the Ziegler-Natta type. All these known ROMP catalysts can, in principle, be used as component (d) in the compositions of this invention.

As the fillers according to component (b) often contain minor amounts of water, it is recommended to use ROMP catalysts which are not susceptible to moisture, such as the ruthenium(+II) complex salts and osmium(+II) complex salts described, inter alia, in WO 96/16100 and WO 96/20235.

Other suitable ROMP catalysts are the metal carbene complexes described in WO 93/20111.

Preferred ROMP catalysts are the compounds of formula I $$(R_1R_2R_3P)_xL_yMe^{2+}Z_1^-Z_2^- \qquad (I),$$

wherein $R_1$, $R_2$ and $R_3$ are each independently of one another H, $C_1$–$C_{20}$alkyl, $C_1$–$C_{20}$-alkoxy; $C_4$–$C_{12}$cycloalkyl or cycloalkoxy which is unsubstituted or substituted by $C_1$–$C_6$-alkyl, $C_1$–$C_6$haloalkyl or $C_1$–$C_6$alkoxy, or $C_6$–$C_{16}$aryl or $C_6$–$C_{16}$aryloxy which is unsubstituted or substituted by $C_1$–$C_6$alkyl, $C_1$–$C_6$haloalkyl or $C_1$–$C_6$alkoxy, or $C_7$–$C_{16}$aralkyl or $C_7$–$C_{16}$aralkyloxy which is unsubstituted or substituted by $C_1$–$C_6$alkyl, $C_1$–$C_6$haloalkyl or $C_1$–$C_6$alkoxy;

$R_2$ and $R_3$ together are tetra- or pentamethylene or tetra- or pentamethylenedioxyl which is unsubstituted or substituted by $C_1$–$C_6$alkyl, $C_1$–$C_6$haloalkyl or $C_1$–$C_6$alkoxy, or tetra- or pentamethylene or tetra- or pentamethylenedioxyl which is unsubstituted or substituted by $C_1$–$C_6$alkyl, $C_1$–$C_6$haloalkyl or $C_1$–$C_6$alkoxy and which is condensed with one or two 1,2-phenylene radicals, or tetramethylenedioxyl which is unsubstituted or substituted by $C_1$–$C_6$alkyl, $C_1$–$C_6$haloalkyl or $C_1$–$C_6$alkoxy and which is condensed in 1,2- and 3,4-position with 1,2-phenylene, and $R_1$ has the meaning cited above; L is a neutral ligand, Me is Ru or Os, $Z_1^-$ and $Z_2^-$ are each a singly charged anion, or $Z_1^-$ and $Z_2^-$ together are a doubly charged anion, x is a number from 1 to 3, and y is a number from 0 to 3, wherein $2 \leq x+y \leq 4$.

The alkyl groups in formula I may be straight-chain or branched. This also applies to the, or every, alkyl moiety of alkoxy, hydroxyalkyl, haloalkyl and other alkyl-containing groups. These alkyl groups preferably contain 1 to 12, particularly preferably 1 to 8 and, most preferably, 1 to 4, carbon atoms.

Alkyl typically includes methyl, ethyl, isopropyl, n-propyl, n-butyl, isobutyl, sec-butyl, tert-butyl as well as the different isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Alkoxy is typically methoxy, ethoxy, propyloxy, isopropyloxy, n-butyloxy, isobutyloxy, sec-butyloxy and tert-butyloxy.

Haloalkyl typically includes fluoromethyl, difluoromethyl, trifluoromethyl, chloromethyl, dichloromethyl, trichloromethyl, 2,2,2-trifluoroethyl, 2-fluoroethyl, 2-chloroethyl, 2,2,2-trichloroethyl as well as halogenated, in particular fluorinated or chlorinated, isopropyl, n-propyl, n-butyl, isobutyl, sec-butyl and tert-butyl groups as well as the different isomeric halogenated pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Cycloalkyl is preferably $C_5$–$C_8$cycloalkyl, in particular $C_5$- or $C_6$cycloalkyl. Typical examples are cyclopropyl, dimethylcyclopropyl, cyclobutyl, cyclopentyl, methylcyclopentyl, cyclohexyl, cycloheptyl and cyclooctyl.

Cycloalkoxy groups are, for example, cyclopentyloxy, methylcyclopentyloxy and cyclohexyloxy.

Aryl preferably contains 6 to 10 carbon atoms and may typically be phenyl, pentalinyl, indenyl, naphtyl, azulinyl and anthryl.

Aryloxy groups are, for example, phenyloxy, naphthyloxy and anthryloxy.

Aralkyl preferably contains 7 to 12 carbon atoms and, particularly preferably, 7 to 10 carbon atoms. Aralkyl may typically be benzyl, phenethyl, 3-phenylpropyl, $\alpha$-methylbenzyl, 4-phenylbutyl and $\alpha,\alpha$-dimethylbenzyl.

Illustrative examples of aralkyloxy groups are benzyloxy, phenethyloxy, 3-phenylpropyloxy, $\alpha$-methylbenzyloxy, 4-phenylbutyloxy and $\alpha,\alpha$-dimethylbenzyloxy.

Hydroxyalkyl typically includes hydroxymethyl, hydroxyethyl, 1-hydroxyisopropyl, 1-hydroxy-n-propyl, 2-hydroxy-n-butyl, 1-hydroxyisobutyl, 1-hydroxy-sec-butyl, 1-hydroxy-tert-butyl as well as the different hydroxyl-substituted isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

Preferred components (d) are compounds of formula I, wherein Me is ruthenium.

Other preferred components (d) are compounds of formula 1, wherein $R_1$, $R_2$ and $R_3$ are each independently of one another $C_1$–$C_6$alkyl, $C_1$–$C_6$alkoxy, $C_4$–$C_{12}$cycloalkyl, $C_4$–$C_{12}$cycloalkoxy, $C_6$–$C_{16}$aryl or $C_6$–$C_{16}$aryloxy.

Particularly preferred compounds are those of formula I, wherein $R_1$, $R_2$ and $R_3$ are each independently of one another isopropyl, sec-butyl, phenyl, tolyl, cyclopentyl or cyclohexyl.

L in formula I is preferably benzene, thiophene, benzonitrile or acetonitrile which are unsubstituted or substituted by 1 to 3 $C_1$–$C_4$alkyl, nitrogen ($N_2$), unsubstituted or partially or completely fluorinated $C_1$–$C_4$alcohol, CO, $H_2O$ or $NH_3$.

Those compounds of formula I are also preferred, wherein $Z_1^-$ and $Z_2^-$ are each independently of one another H$^-$, F$^-$, Cl$^-$, Br$^-$, I$^-$, or cyclopentadienyl which is unsubstituted or substituted by one or several hydroxide groups, amino groups, halogen atoms, $C_1$–$C_{20}$alkyl groups, $C_1$–$C_{20}$alkoxy groups, $C_4$–$C_{12}$cycloalkyl groups, $C_4$–$C_{12}$cycloalkoxy groups, $C_6$–$C_{16}$aryl groups, $C_6$–$C_{16}$aryloxy groups or $C_7$–$C_{16}$aralkyl groups.

The complex compounds of formula I are known and are described, inter alia, in WO 96/16100 and WO 96/20235.

Typical examples of ruthenium and osmium compounds of of formula I are [tos denotes tosylate, Cp is cyclopentadienyl, and $C_6H_{11}$ is cyclohexyl]:
$(C_6H_{11})_2HPRu(p\text{-cymene})Cl_2$, $(C_6H_{11})_3PRu(p\text{-cymene})Cl_2$, $(C_6H_{11})_3PRu(p\text{-cymene})(tos)_2$, $(C_6H_{11})_3PRu(p\text{-cymene})Br_2$, $(C_6H_{11})_3PRu(p\text{-cymene})ClF$, $(C_6H_{11})_3PRu(C_6H_6)(tos)_2$, $(C_6H_{11})_3PRu(CH_3\text{—}C_6H_5)(tos)_2$, $(C_6H_{11})_3PRu(C_{10}H_8)(tos)_2$, $(i\text{-}C_3H_7)_3PRu(p\text{-cymene})Cl_2$, $(CH_3)_3PRu(p\text{-cymene})Cl_2$, $(C_6H_{11})_3PRu(CH_3\text{—}CN)(C_2H_5\text{—}OH)(tos)_{21}$ $(C_6H_{11})_3PRu(p\text{-cymene})(CH_3\text{—}CN)_2(PF_6)_2$, $(C_6H_{11})_3PRu(p\text{-cymene})(CH_3\text{—}CN)_2(tos)_2$, $(n\text{—}C_4H_9)_3PRu(p\text{-cymene})(CH_3\text{—}CN)_2(tos)_2$, $(C_6H_{11})_3PRu(CH_3CN)Cl_2$, $(C_6H_{11})_3PRu(CH_3\text{—}CN)_2Cl_2$, $(n\text{-}C_4H_9)_3PRu(p\text{-cymene})Cl_2$, $(C_6H_{11})_3PRu(p\text{-cymene})(C_2H_5OH)_2(BF_4)_2$, $(C_6H_{11})_3PRu(p\text{-cymene})(C_2H_5OH)_2(PF_6)_2$, $(i\text{-}C_3H_7)_3POs(p\text{-cymene})Cl_2$, $(CH_3)_3POs(p\text{-cymene})Cl_2$, $(C_6H_5)_3POs(p\text{-cymene})Cl_2$, $[(C_6H_{11})_3P]_3Ru(CH_3\text{—}CN)$, ($C_5H_9)_3PRu(p-cymene)Cl_2$, $(C_6H_{11})_3PRu(p-cymene)HCl$, $(C_6H_{11})_3PRu[1,2,4,5-(CH_3)_4C_6H_2]Cl_2$, $(C_6H_{11})_3PRu[1,3,5-(i-C_3H_7)_3C_6H_3]Cl_2$, $(C_6H_{11})_3PRu[(C_4H_9)-C_6H_5]Cl_2$, $(C_6H_{11})_3POs(p-cymene)Cl_2$, $(C_6H_5)_3Ru(p-cymene)HCl$, $[(C_6H_{11})_3P]_2Ru(CH_3-CN)(tos)_2$, $RuCl_2(p-cymene)[(C_6H_{11})_2PCH_2CH_2P(C_6H_{11})_2]$, $(C_6H_{11})_3PRu(p-cymene)(C_2H_5OH)(BF_4)_2$, $(C_6H_{11})_3PRU(C_6H_6)(C_2H_5OH)_2(tos)_2$, $(C_6H_{11})_3PRu(i-C_3H_7-C_6H_5)(tos)_2$, $(C_6H_{11})_3PRu(C_6H_6)(p-cymene)Br_2$, $(C_6H_{11})_3PRu(biphenyl)(tos)_2$, $(C_6H_{11})_3PRu(anthracene)(tos)_2$, $(2-CH_3C_6H_4)_3POs(p-cymene)Cl_2$ and $C_6H_{11})_3PRu(chrysene)(tos)_2$.

Particularly preferred compounds of formula I are $[(C_6H_{11})_3P]_2RuCl_2$, $[(C_6H_5)_3P]_3 RuCl_2$, $[(C_6H_5)_3P]_3 (CO)RuH_2$, $[(C_6H_5)_3P]_3 RuClCp$, $[(C_6H_{11})_3P]_2(CH_3OH)Ru(tos)_2$, $[(o-tolyl)_3P]_3RuCl_2$, $[(CH_3)_2CH]_3P(p-cymene)RuCl_2$ and, in particular, $(C_6H_{11})_3P(p-cymene)RuCl_2$.

Component (d) is present in the novel compositions in an amount of preferably 0.01–15.0% by weight, more preferably of 0.1–10.0% by weight, based on the sum of components (a)+(b).

The addition of specific silanes results in a substantial drop in viscosity. In this manner it is possible to achieve a particularly high filler content (without sedimentation of the filler).

Accordingly, this invention also relates to a composition comprising the above-defined components (a) to (c), optionally (d), and, additionally, (e) a silane of formula II

(II)

wherein R is a monovalent organic group containing 2 to 100 carbon atoms, wherein one or several carbon atoms can be replaced with O, S, N or Si atoms, and $Y_1$, $Y_2$ and $Y_3$ are each independently of one another $C_1$–$C_{20}$alkyl, $C_5$–$C_{20}$aryl, $C_6$–$C_{20}$aralkyl, $C_5$–$C_{12}$cycloalkyl, $C_2$–$C_{20}$-alkoxyalkyl or $C_1$–$C_{20}$acyl.

The silanes of formula II are known and can be prepared by known methods. Some of these silanes are commercially available.

Preferred silanes are those of formula 11, wherein R defined as a monovalent organic group containing 2 to 100 carbon atoms is $C_1$–$C_{20}$alkyl, $C_5$–$C_{20}$aryl, $C_6$–$C_{20}$aralkyl, $C_5$–$C_{12}$cycloalkyl, $C_2$–$C_{20}$alkoxyalkyl, $C_2$–$C_{20}$alkenyl, $C_4$–$C_{25}$acryloxyalkyl, $C_4$–$C_{25}$methacryloxyalkyl, $C_2$–$C_{20}$aminoalkyl, $C_4$–$C_{25}$glycidyloxyalkyl, $C_7$–$C_{25}$epoxycyclohexylalkyl or a radical of a polysiloxane.

R, $Y_1$, $Y_2$ or $Y_3$ defined as alkyl typically includes methyl, ethyl, isopropyl, n-propyl, n-butyl, isobutyl, sec-butyl, tert-butyl as well as the different isomeric pentyl, hexyl, heptyl, octyl, nonyl, decyl, undecyl, dodecyl, tridecyl, tetradecyl, pentadecyl, hexadecyl, heptadecyl, octadecyl, nonadecyl and eicosyl groups.

R, $Y_1$, $Y_2$ or $Y_3$ defined as aryl preferably contains 6 to 10 carbon atoms and may typically be phenyl, pentalinyl, indenyl, naphtyl, azulinyl and anthryl.

R, $Y_1$, $Y_2$ or $Y_3$ defined as aralkyl preferably contains 7 to 12 carbon atoms and, particularly preferably, 7 to 10 carbon atoms. Aralkyl may be, for example, benzyl, phenethyl, 3-phenylpropyl, α-methylbenzyl, 4-phenylbutyl and α,α-dimethylbenzyl.

R, $Y_1$, $Y_2$ or $Y_3$ defined as cycloalkyl is preferably $C_5$–$C_8$cycloalkyl, particularly preferably $C_5$- or $C_6$cycloalkyl. Typical examples are cyclopropyl, dimethylcyclopropyl, cyclobutyl, cyclopentyl, methylcyclopentyl, cyclohexyl, cycloheptyl and cyclooctyl.

Illustrative examples of R, $Y_1$, $Y_2$ or $Y_3$ defined as alkoxyalkyl are 2-methoxyethyl, 2-ethoxyethyl, 2-methoxypropyl, 3-methoxypropyl, 2-ethoxypropyl and 3-ethoxypropyl.

Alkenyl R includes, for example, propenyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-octadec-2-enyl and n-octadec-4-enyl.

Typical examples of acryloxyalkyl and methacryloxyalkyl are 2-acryloxyethyl, 2-methacryloxyethyl, 3-acryloxypropyl and 3-methacryloxypropyl.

Suitable aminoalkyl groups are, for example, 2-aminoethyl, 3-aminopropyl, 3-aminobutyl and 4-aminobutyl.

Suitable glycidyloxyalkyl groups are, for example, 2-glycidylethyl, 3-glycidylpropyl, 3-glycidylbutyl and 4-glycidylbutyl.

Epoxycyclohexylalkyl is preferably β(3,4-epoxycyclohexyl)ethyl.

R in formula II is preferably methyl, ethyl, n-octyl, vinyl, 3-mercaptopropyl, 3-aminopropyl, 3-glycidyloxypropyl, 3-acryloxypropyl, 3-methacryloxypropyl, β-(3,4-epoxycyclohexyl)ethyl, N-(β-aminoethyl)-3-aminopropyl, 3-ureidopropyl, 3-isocyanatopropyl, $H_2N$—$CH_2CH_2NH$—$CH_2CH_2NH$—$CH_2CH_2CH_2$—, $(CH_3O)_3Si$—$CH_2CH_2CH_2NH$—$CH_2CH_2CH_2$— or a $(CH_3O)_3SiCH_2CH_2CH_2$ N'NCH$_2$CH CH$_2$Si(OCH$_3$)$_3$ group of formula

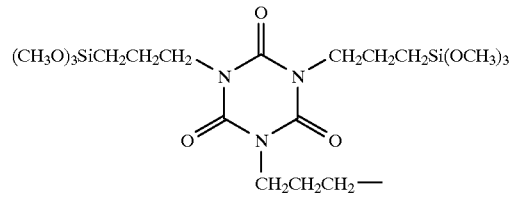

Particularly preferred silanes of formula II are those, wherein R is methyl, vinyl, 3-mercaptopropyl or 3-aminopropyl.

$Y_1$, $Y_2$ and $Y_3$ in formula II are preferably methyl, ethyl, acetyl or 2-methoxyethyl.

Typical examples of suitable silanes of formula II are octyltriethoxysilane, methyltriethoxysilane, methyltrimethoxysilane, tris[3-(trimethoxysilyl)propyl] isocyanurate, vinyltriethoxysilane, vinyltrimethoxysilane, vinyl-tris(2-methoxyethoxy)silane, γ-methacryloxypropyltrimethoxysilane, β-(3,4-epoxycyclohexyl)ethyltrimethoxysilane, γ-glycidyloxypropyltrimethoxysilane, γ-mercaptopropyltrimethoxysilane, γ-aminopropyltriethoxysilane, γ-aminopropyltrimethoxysilane, N-(β-aminoethyl)-γ-aminopropyltrimethoxysilane, $H_2NCH_2CH_2NHCH_2CH_2NHCH_2CH_2CH_2Si(OCH_3)_3$, bis[γ-(trimethoxysilyl)propyl]amine, organically modified polydimethylsiloxane of formula

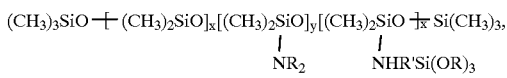

where R and R' = alkyl or aryl,

γ-ureidopropyltrimethoxysilane, γ-isocyanatopropyltriethoxysilane, 3-chloropropyltrimethoxysilane, 3-triethoxysilylpropylsuccinic anhydride, 3-methacryloxypropyltrimethoxysilane, vinyl-tris(2-methoxyethoxy)silane, vinyltriacetoxysilane, 3-mercaptopropyltrimethoxysilane, 3-glycidyloxypropyltriethoxysilane, 3-(2-aminoethylamino) propyltrimethoxysilane and 3-(2-aminoethylamino) propylmethyidimethoxysilane.

Vinyltrimethoxysilane is particularly preferred.

Component (e) is preferably used in an amount of 0.05–10.0% by weight, more preferably of 0.1–2.0% by weight, based on the sum of components (a)+(b).

In addition to the above-mentioned additives, the novel compositions can contain further customary additives, typically antioxidants, light stabilisers, plasticisers, colourants, fillers, pigments, antifoams, antistatic agents, lubricants and mould release agents.

The novel compositions can also contain inert solvents. Suitable inert solvents are, for example, protic-polar and aprotic solvents which can be used by themselves or in mixtures consisting of at least two solvents. Typical examples are: ethers (dibutyl ether, tetrahydrofuran, dioxane, 2-methoxyethanol or ethylene glycol dimethyl ether, 2-ethoxyethanol or ethylene glycol diethyl ether, diethylene glycol diethyl ether, triethylene glycol dimethyl ether), halogenated hydrocarbons (methylene chloride, chloroform, 1,2-dichloroethane, 1,1,1-trichloroethane, 1,1,2,2-tetrachloroethane), carboxylates and lactones (ethyl acetate, methyl propionate, ethyl benzoate, 2-methoxyethyl acetate, γ-butyrolactone, ε-valerolactone, pivalolactone), carboxamides and lactams (N,N-dimethylformamide, N,N-diethylformamide, N,N-dimethyl acetamide, tetramethylurea, hexamethylphosphoric triamide, γ-butyrolactam, ε-caprolactam, N-methylpyrrolidone, N-acetylpyrrolidone, N-methylcaprolactam), sulfoxides (dimethylsulfoxide), sulfones (dimethylsulfone, diethylsulfone, trimethylenesulfone, tetramethylenesulfone), tertiary amines (N-methylpiperidine, N-methylmorpholine), aliphatic and aromatic hydrocarbons, typically petroleum ether, pentane, hexane, cyclohexane, methylcyclohexane, benzene or substituted benzenes (chlorobenzene, o-dichlorobenzene, 1,2,4-trichlorobenzene, nitrobenzene, toluene, xylene) and nitriles (acetonitrile, propionitrile, benzonitrile, phenylacetonitrile). Preferred solvents are aprotic polar and nonpolar solvents.

Preferred solvents are aliphatic and aromatic hydrocarbons as well as mixtures of such solvents.

It is a particular advantage of the novel compositions that, in the case of liquid monomers, a metathesis polymerisation can be carried out without using a solvent.

To be highlighted in particular is the high storage stability of the novel compositions which form suspensions which are stable over a very long period of time, no sedimentation of the filler being found.

The novel composition can be prepared directly before polymerisation or can be used in the form of a preformulated mixture. The mixtures can be stored for an extended period of time as ready-to-use formulation before polymerisation, which is advantageous for large scale industrial application. However, it is advisable to store the mixture with the exclusion of light if the catalyst contains photosensitive ligands.

In another of its aspects, this invention relates to a process for the preparation of a metathesis polymer, which comprises heating a composition comprising components (a) to (d) to >40° C.

The process of this invention is conveniently carried out in the temperature range of at least 60° C., preferably of 60 to 300° C., particularly preferably of 60 to 200° C. and, most preferably, of 70 to 160° C. After polymerisation it may be useful to after-bake the mixture at elevated temperatures, typically in the range from 80 to 200° C.

If component (d) is a compound of formula I with photosensitive ligands, the metathesis polymersiation may also be carried out photochemically. In this case, a composition comprising components (a) to (d) is irradiated with UV radiation or visible light and is then heat-postcured, if required.

The polymerisation can involve moulding processes, for example calendering, casting, compression moulding, injection moulding or extruding processes. Using the novel process it is possible to prepare materials for the preparation of moulded articles of all kinds as well as coatings. Moulding and polymerisation are usefully combined in solvent-free reactive systems, in which case it is possible to use processing techniques such as injection moulding, extrusion, polymerisations in given moulds (if required under pressure).

The polymers prepared according to the novel process contain homopolymers, copolymers with random distribution of the structural units, graft polymers, block polymers or crosslinked polymers. The polymers may have an average molecular weight of 500 up to 2,000,000 dalton, preferably of 1000 to 1,000,000 dalton (determined by gel permeation chromatography).

The polymers prepared in accordance with the novel process are particularly distinguished by their high heat stability, excellent toughness and mechanical strength as well as by good electrical properties (low dielectric constant, low loss factor or tans value) and are particularly suitable for applications in vacuum casting technology, as casting resins, impregnating resins and especially as encapsulating materials for electrical and electronic components.

The cured casting compounds have good mechanical and dielectrical properties and long durability.

Accordingly, this invention also relates to the use of the novel compositions as casting resin, impregnating resin and as encapsulating material for electrical or electronic components.

EXAMPLES

The dicyclopentadiene used in the following Examples is degassed for about 10 minutes under vacuum (3 mbar) before use.

The following commercially available substances are also used:

fillers:
  Millisil® W 12 (quartz powder, of Quarzwerke Frechen)
  Wollastonite FW 200 (of OY Partek AB, Helsinki)
  DS 206 (aluminium oxide)
  Juraweiss® Gelbsiegel (CaCO$_3$)
  Apyral® 4 (aluminium oxide trihydrate, of Nabaltek)
core/shell polymers:
  Paraloid® EXL 2600 (methyl methacrylate/butadiene/styrene, of Rohm and Haas)

Paraloid® EXL 2647 (methyl methacrylate/butadienelstyrene, of Rohm and Haas)
Silquest® Silan A-171 vinyltrimethoxysilane (of Osi Specialties)

Examples 1–12

The amount of dicyclopentadiene given in Table 1 is mixed with the core/shell polymer. With stirring, the filler is added in portions and this mixture is then stirred using a dissolver for 15 min at room temperature. Using a Rheomat RM 265, the viscosity at 25° C. is determined in a Mettler measuring beaker MB 125 at two different shear rates (viscosity 1: shear rate 6.65 s$^{-1}$, viscosity 2: shear rate 100 s$^{-1}$). The compositions and the results of the viscosity measurements are compiled in Tables 1 and 2.

TABLE 1

| Composition | 1 | 2 | 3 | 4 | 5 | 6 |
|---|---|---|---|---|---|---|
| dicyclopentadiene [g] | 40.0 | 40.0 | 40.0 | 39.9 | 29.95 | 29.95 |
| Wollastonite FW 200 [g] | 60.0 | 60.0 | | | | |
| Millisil W 12 [g] | | | 60.0 | 60.0 | 70.0 | 70.0 |
| Paraloid EXL 2647 [g] | | 0.1 | | 0.1 | 0.05 | 0.05 |
| Silan A-171 [g] | | | | | | 0.3 |
| viscosity 1 [MPa · s] | 625 | 1400 | 1350 | 3780 | 4500 | 2600 |
| viscosity 2 [MPa · s] | 200 | 200 | 900 | 950 | 1400 | 850 |

TABLE 2

| Composition | 7 | 8 | 9 | 10 | 11 | 12 |
|---|---|---|---|---|---|---|
| dicyclopentadiene [g] | 40.0 | 39.8 | 39.95 | 39.95 | 40.0 | 39.9 |
| Wollastonite FW 200 [g] | | | 30.0 | 30.0 | | |
| DS 206 [g] | 60.0 | 60.0 | | | | |
| Juraweiss Gelbsiegel [g] | | | 30.0 | 30.0 | | |
| Apyral 4 [g] | | | | | 60.0 | 60.0 |
| Paraloid EXL 2600 [g] | | 0.2 | | | | |
| Paraloid EXL 2600 [g] | | | 0.05 | 0.05 | | 0.1 |
| Silan A-171 [g] | | | | 0.3 | | |
| viscosity 1 [MPa · s] | 1750 | 3700 | 2800 | 2250 | 2250 | 5600 |
| viscosity 2 [MPa · s] | 400 | 750 | 1200 | 600 | 800 | 1200 |

The mixtures of Examples 1–12 can be polymerised without any problems after the addition of $(C_6H_{11})_3P$(p-cymene)$RuCl_2$ as ROMP catalyst and give polymers having good mechanical and electrical properties.

What is claimed is:

1. A composition comprising
   (a) a strained cycloolefin,
   (b) a filler,
   (c) 0.01–10.0% by weight, based on the sum of components (a)+(b), of a copolymer selected from the group consisting of a core/shell polymer and a microgel, and
   (d) a catalyst for the ring-opening metathesis polymerisation which is a compound of formula I $$(R_1R_2R_3P)_xL_yMe^{2+}Z_1^-Z_2^-  \quad (I)$$

wherein $R_1$, $R_2$ and $R_3$ are each independently of one another H, $C_1$–$C_{20}$alkyl, $C_1$–$C_{20}$alkoxy, $C_4$–$C_{12}$cycloalkyl or cycloalkoxy which is unsubstituted or substituted by $C_1$–$C_6$alkyl, $C_1$–$C_6$haloalkyl or $C_1$–$C_6$alkoxy, or $C_6$–$C_{16}$aryl or $C_6$–$C_{16}$aryloxy which is unsubstituted or substituted by $C_1$–$C_6$alkyl, $C_1$–$C_6$haloalkyl or $C_1$–$C_6$alkoxy, or $C_7$–$C_{16}$aralkyl or $C_7$–$C_{16}$aralkyloxy which is unsubstituted or substituted by $C_1$–$C_6$alkyl, $C_1$–$C_6$haloalkyl or $C_1$–$C_6$alkoxy; or $R_2$ and $R_3$ together are tetra- or pentamethylene or tetra- or pentamethylenedioxy which is unsubstituted or substituted by $C_1$–$C_6$alkyl, $C_1$–$C_6$haloalkyl or $C_1$–$C_6$alkoxy, or tetra- or pentamethylene or tetra- or pentamethylenedioxy which is unsubstituted or substituted by $C_1$–$C_6$alkyl, $C_1$–$C_6$haloalkyl or $C_1$–$C_6$alkoxy and which is condensed with one or two 1,2-phenylene radicals, or tetramethylenedioxy which is unsubstituted or substituted by $C_1$–$C_6$alkyl, $C_1$–$C_6$haloalkyl or $C_1$–$C_6$alkoxy and which is condensed in 1,2- and 3,4-position with 1,2-phenylene, and $R_1$ has the meaning cited above:

L is a neutral ligand, Me is Ru or Os, $Z_1^-$ and $Z_2^-$ are each a singly changed anion, or $Z_1^-$ and $Z_2^-$ together are a doubly charged anion, x is a number from 1 to 3, and v is a number from 0 to 3, wherein $2 \leq x+y \leq 4$.

2. A composition according to claim 1, wherein component (a) is a Diels-Alder adduct of cyclopentadiene.

3. A composition according to claim 1, wherein component (a) is norbornene, norbornadiene, cyclohexenylnorbornene, dicyclopentadiene, tetracyclododecene or methyltetracyclododecene.

4. A composition according to claim 1, wherein component (b) is a metal oxide, metal carbonate, metal sulfate or metal silicate, or $SiO_2$.

5. A composition according to claim 1, wherein component (b) is $CaCO_3$, $Al_2O_3$, $Al(OH)_3$, wollastonite or $SiO_2$.

6. A composition according to claim 1, wherein component (c) is a core/shell polymer.

7. A composition according to claim 1, wherein component (c) is a microgel.

8. A composition according to claim 1, wherein the weight ratio of components (a):(b) is from 5:1 to 1:5.

9. A composition according to claim 1, which comprises 0.02–2.0% by weight of component (c), based on the sum of components (a)+(b).

10. A composition according to claim 1, which additionally comprises (e) a silane of formula II

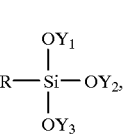

(II)

wherein R is a monovalent organic group containing 2 to 100 carbon atoms, wherein one or several carbon atoms may be replaced with O, S, N or Si atoms, and $Y_1$, $Y_2$ and $Y_3$ are each independently of one another $C_1$–$C_{20}$alkyl, $C_5$–$C_{20}$aryl, $C_6$–$C_{20}$aralkyl, $C_5$–$C_{12}$-cycloalkyl, $C_2$–$C_{20}$alkoxyalkyl or $C_1$–$C_{20}$acyl.

11. A process for the preparation of a metathesis polymer, which comprises heating a composition according to claim 10 to >40° C.

12. A process for the preparation of a metathesis polymer, which comprises heating a composition according to claim 10 to >40° C.

13. A composition according to claim 1, wherein component (d) is a compound of formula (I) where Me is Ru.

* * * * *